United States Patent
De Gaillard

(10) Patent No.: US 7,077,462 B1
(45) Date of Patent: Jul. 18, 2006

(54) MODULAR AUTOMOBILE ROOF

(75) Inventor: Francois De Gaillard, Mouilleron en Pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/297,294

(22) PCT Filed: Jun. 5, 2000

(86) PCT No.: PCT/EP00/05125

§ 371 (c)(1),
(2), (4) Date: Dec. 4, 2002

(87) PCT Pub. No.: WO01/94141

PCT Pub. Date: Dec. 13, 2001

(51) Int. Cl.
*B60J 7/00* (2006.01)

(52) U.S. Cl. .......................... 296/216.01; 296/216.04; 296/193.04; 296/210

(58) Field of Classification Search ........... 296/216.01, 296/197, 210, 193.03, 193.04, 102, 211, 215, 296/216.02, 178, 216.04
See application file for complete search history.

(56) References Cited

U.S. PATENT DOCUMENTS

| | | | | |
|---|---|---|---|---|
| D155,614 S | * | 10/1949 | Klein et al. | .................. 296/210 |
| 2,921,814 A | * | 1/1960 | Mede | .......................... 296/215 |
| 5,540,478 A | | 7/1996 | Schüch | |
| 5,599,059 A | * | 2/1997 | Shann | .......................... 280/748 |
| 6,056,352 A | * | 5/2000 | Ewing et al. | ................ 296/214 |
| 6,340,204 B1 | * | 1/2002 | Seifert | .................... 296/216.07 |
| 6,502,895 B1 | * | 1/2003 | Taylor | .......................... 296/178 |
| 6,682,132 B1 | * | 1/2004 | Hahn | .......................... 296/215 |

FOREIGN PATENT DOCUMENTS

| | | | | | |
|---|---|---|---|---|---|
| BE | 524303 | * | 3/1956 | ............ | 296/216.02 |
| BE | 533581 | * | 5/1958 | ............ | 296/216.02 |
| CH | 133974 | * | 9/1929 | ............ | 296/216.02 |
| DE | 3429880 | * | 2/1986 | ................. | 296/197 |
| DE | 3725807 | * | 2/1988 | ................. | 296/210 |
| DE | 4024837 | * | 2/1992 | ................. | 296/210 |
| DE | 296 01 330 U1 | | 6/1996 | | |
| FR | 1329277 | * | 4/1963 | ................. | 296/210 |
| GB | 386150 | * | 1/1933 | ............ | 296/216.02 |
| GB | 405430 | * | 2/1934 | ................. | 296/178 |
| GB | 2 184 404 A | | 6/1987 | | |
| IT | 484533 | * | 9/1953 | ................. | 296/178 |
| WO | WO 00/29234 | * | 5/2000 | | |

\* cited by examiner

*Primary Examiner*—Dennis H. Pedder
(74) *Attorney, Agent, or Firm*—David S. Safran

(57) ABSTRACT

A modular roof of an automobile (1) comprising a bodyshell roof structure (2) which has a front and rear transverse member (3 or 4) and a right and left side member (5 or 6). The modular roof has at least two modular roof elements (7, 14, 15) which are fixed directly to the roof structure (2). The modular roof elements (7, 14, 15), which extend over the entire breadth of the roof structure, are preferably fixed, especially releasably fixed, to the side members (5, 6) which lie opposite each other.

15 Claims, 5 Drawing Sheets

A

B

C

A

B

C₁

C₂

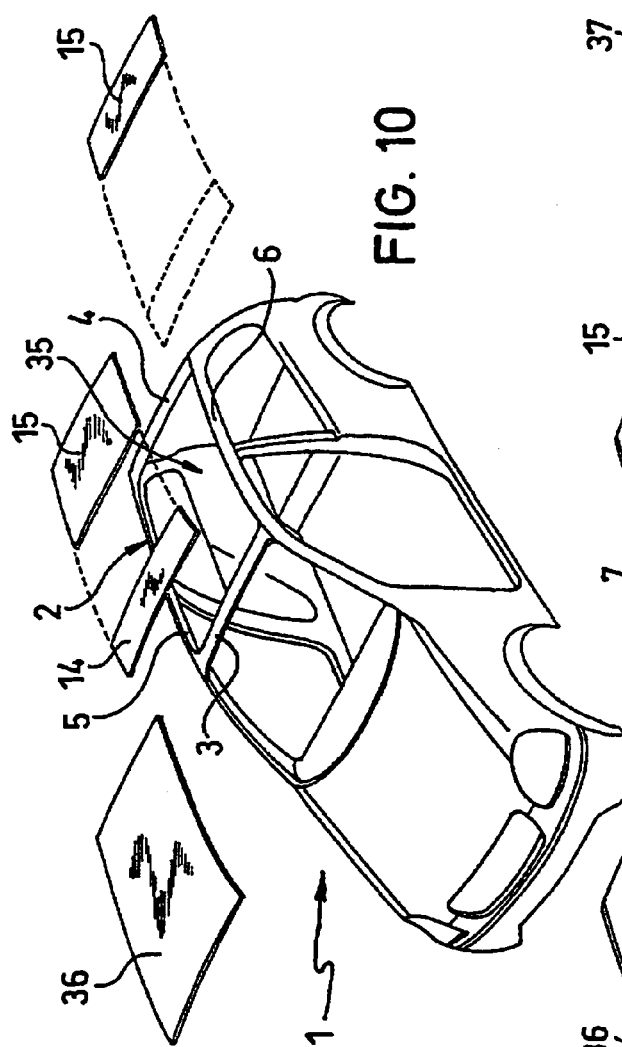
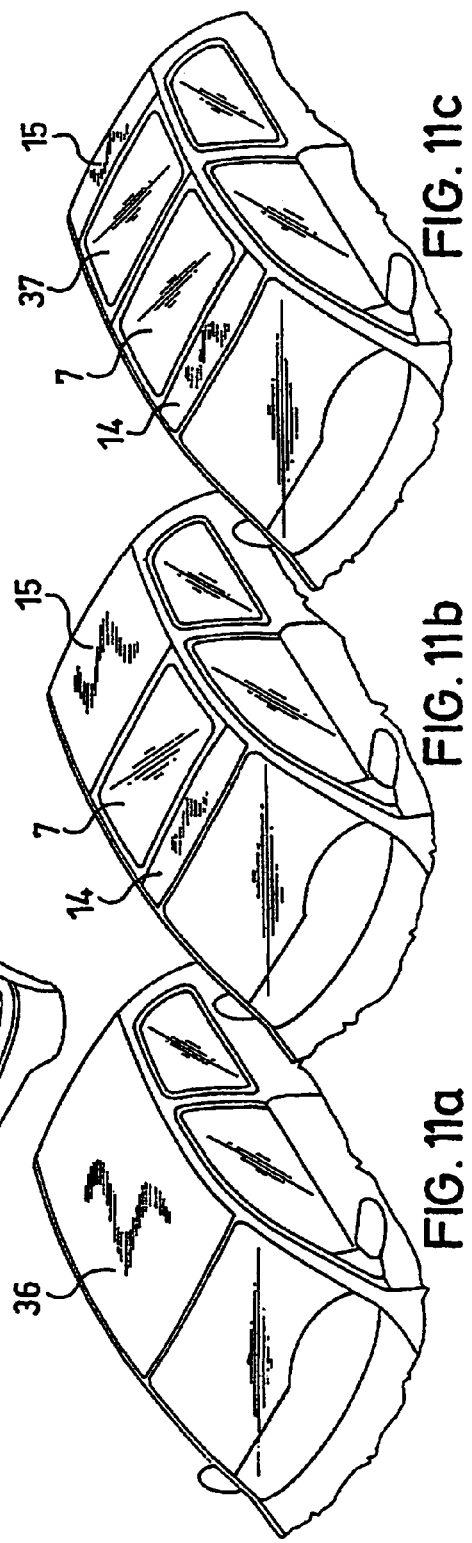

MODULAR AUTOMOBILE ROOF

BACKGROUND OF THE INVENTION

1. Field of the Invention

This invention relates to a modular roof for a motor vehicle having a roof shell structure with a front and a back cross member and a right and a left side member.

2. Description of Related Art

Mounting a sliding roof on the top part of the roof of a conventional motor vehicle which has a roof structure especially made of sheet metal is known. Conventionally, an opening is made in the top part of the roof and then the sliding roof unit is installed. However, even if high quality installation is possible in this way, producing an opening represents an additional working process in addition to the conventional processes of shaping the top part of the roof. Likewise, the equipment necessary for producing this opening requires additional investment compared to that which is necessary for a conventional motor vehicle without a sliding roof.

Published German Patent Application DE 35 45 871 A1, and counterpart published UK Patent Application 2 184 404 A, disclose a vehicle roof which has an installation unit in the form of a roof cap which can be placed later on at least the side roof members of a roof structure and can be fixed thereto. A ready-mounted ventilation means such as, for example, a sliding roof or a spoiler roof is integrated into the roof cap. However, different roof caps, which as an installation unit, always have the same size which is matched to the location of the roof members so that it can be attached to the roof members.

U.S. Pat. No. 5,540,478, discloses a roof structure for a motor vehicle in which the vehicle manufacture provides a roof shell with dimensionally defined master mounting points to which a modular roof insert, which is completely premounted by the supplier with a sunroof, can be mounted. In this way, regardless of the roof superstructure of the different roof parts to be attached thereto, assembly always takes place at the same master mounting points at the vehicle manufacturer.

SUMMARY OF THE INVENTION

The primary object of this invention is to devise a generic modular roof which enables a more variable configuration of the vehicle roof with simplified production, and a motor vehicle with such a modular roof.

This object is achieved in a general modular roof by the modular roof having at least two roof module elements which are attached directly to the roof structure. By selective combination of at least two roof module elements, diversely configured modular or vehicle roofs can be formed, the cost necessary for this purpose being much less than if each desired version had to be warehoused as a complete part.

Preferably, the roof module elements which extend over the entire width of the roof structure are mounted on the opposing side members so that intermediate elements or the like are not necessary. If the roof module elements are detachably mounted, a mounted modular roof can be converted by replacement of the roof module elements.

Variability of the modular roof is ensured by the cross members and the side members bordering a roof structure opening which can be closed partially or completely by at least two roof module elements.

A roof opening which remains between two roof module elements or between one roof module element and one cross member can be closed by a least one other roof module element. In general, the roof module elements can be covers, transparent covers, glass covers or functional roof parts such as openable roof parts and especially sliding roof units.

Feasibly, the roof structure is made of sheet metal, but also other materials, such as high-strength plastics can be used.

The individual roof module elements can be made frameless or they can have a frame, especially as a sliding roof unit. A roof module element or a sliding roof unit can have a frame with a front and a back cross frame element and a right and a left side frame element and can hold a cover which is movably supported on the frame, each of the side frame elements comprising means for attaching this side frame element to the respective side member and each of the cross frame elements extending over the entire width of the roof structure between the two side members.

In one simple configuration, the front cross frame element can be designed for direct attachment to the cross member on the top edge of the windshield and the back cross frame element for direct attachment to the cross member on the top edge of the rear window.

Preferably, each frame element which is attached directly to the assigned member of the roof structure has means so that, with the interposition of a seal, it rests on a flange which is provided on the inside of the member.

Feasibly, the sliding roof unit can be attached to the roof structure as a partial system which is completely prefabricated with an inner lining. In general, each roof module element which contains additional components can be prefabricated so that final installation on the vehicle roof is simplified.

To achieve this object in a motor vehicle with an especially sheet metal roof structure for holding a modular roof which is made according to the aforementioned statements, it is proposed that the motor vehicle, in a respective modular roof, holds alternatively, an openable roof unit which is installed between a front roof module element and a back roof module element, or an openable roof unit which is installed between the front cross member and the back roof module element, or an openable roof unit which is installed between the back cross member and a front roof element or the front cross member and that the openable roof unit is especially a sliding roof unit.

Embodiments of the invention are explained in detail below with reference to the accompanying drawings.

BRIEF DESCRIPTION OF THE DRAWINGS

FIG. 10 is a perspective overhead view of the shell of a motor vehicle with a roof structure for the modular roof;

FIG. 11 shows, in views 11a, 11b, and 11c, a modular roof made of different roof module elements.

DETAILED DESCRIPTION OF THE INVENTION

Figure 1:
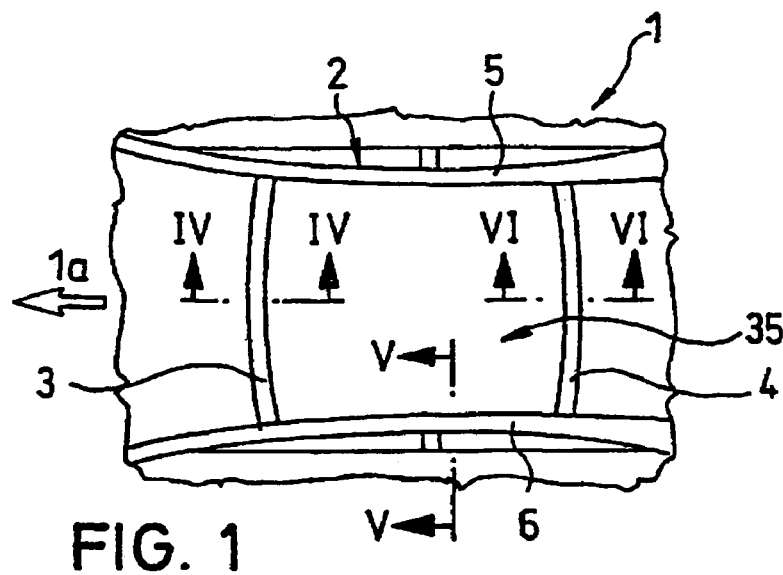
FIG. 1 is a schematic top view of a roof structure of a modular roof of a motor vehicle.

The shell of a motor vehicle 1 with a modular roof contains a roof structure 2 (see FIG. 1 and FIG. 10) with a front cross member 3 on the top edge of the windshield, a back cross member 4 on the top edge of the rear window and a right and a left side member 5 and 6. The members 3, 4, 5, and 6 surround the roof structure opening 35 of the shell. The reference direction which corresponds to the forward direction of motion of the motor vehicle 1 is shown schematically by the arrow 1a in FIG. 1.

Roof module elements such as, for example, the front roof module element 14 (see FIGS. 2, 11b and c), a back roof module element 15 and a sliding roof unit 7 supplement and complete the modularly built modular roof in a selectively fixable arrangement, especially the front and the back roof module element 14 and 15 being available and installable in different sizes.

The sliding roof unit 7 contains a frame 8 (see FIG. 2) which is formed by a front and a back cross frame element 9 and 10 and by a right and a left side frame element 11 and 12. A sliding roof cover 13 is movably supported on the frame 8. These sliding roofs are known and therefore are not explained in detail. Each of the side frame elements 11, 12 contains means for attaching this frame element 11, 12 to the assigned side member 5, 6 of the roof structure and each of the cross frame elements 9, 10 extends between the two side members 5, 6 over the entire width of the roof structure 2.

Figure 2:
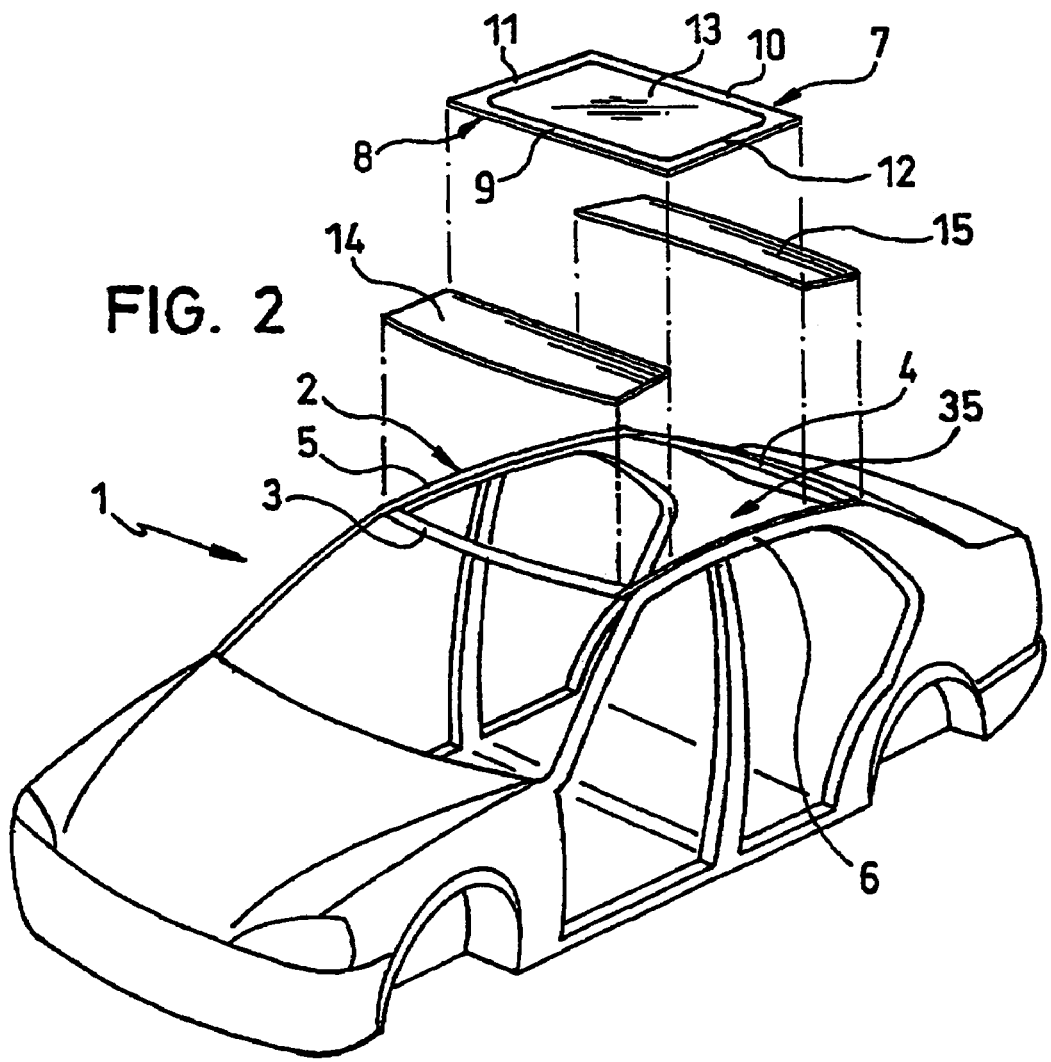
FIG. 2 is a schematic perspective view of the installation of a sliding roof unit and other roof module elements according to one embodiment of this invention.

In the embodiment shown in FIG. 2, the sliding roof unit 7 is installed between the front roof module element 14 and the back roof module element 15 which are attached to the front cross member 3 or the back cross member 4.

Figure 3:
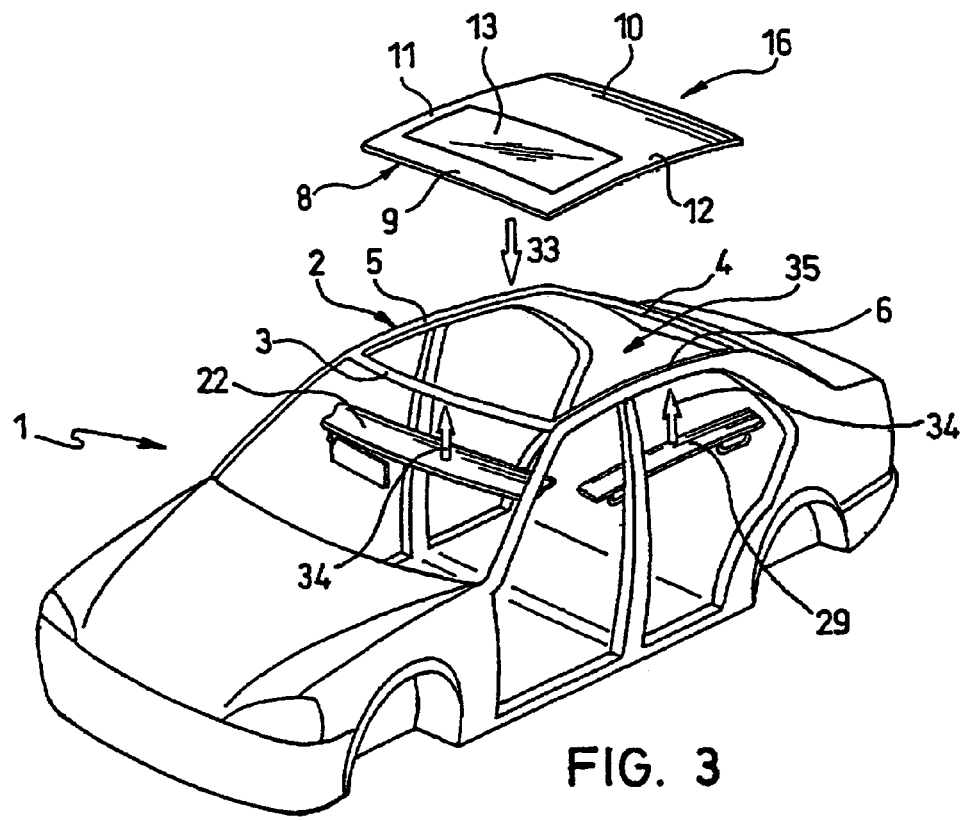
FIG. 3 is a view similar to FIG. 2 of another embodiment of this invention.

In the embodiments shown schematically in FIG. 3, the roof structure 2 contains a sliding roof unit 16 with a front cross frame element 9 which is directly attached to the front cross member 3, and with a back cross frame element 10 which is directly attached to the back cross member 4. In this case, the transition between the sliding roof unit 16 and the rear window can be made in any manner.

The roof structure 2 can also comprise several sliding roof units for producing a modular roof; they have different lengths in the lengthwise direction of the vehicle so that they can be connected to front and back roof module elements 14, 15 of different dimensions, and in the case of direct attachment of the front or the back cross frame element 9 and 10, to the front cross member 3 or to the back cross member 4, these roof module elements 14, 15 can be omitted.

FIGS. 8A, 8B, 8C and 9A, 9B, $9C_1$ and $9C_2$ show three embodiments of modular roofs for the same motor vehicles.

Figure 8:
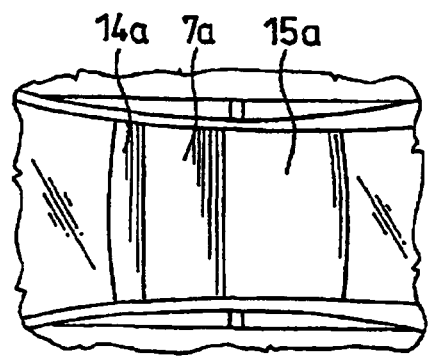
FIG. 8 shows, in views 8A, 8B, and 8C, three different modular roofs of this invention for the same motor vehicle.
Figure 8:
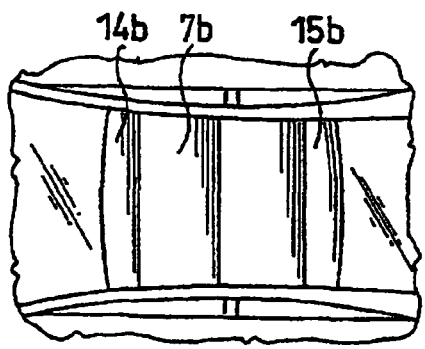
Figure 8:
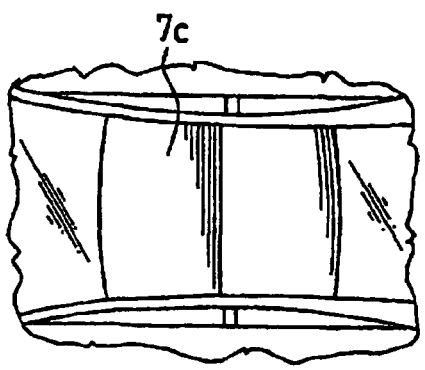
Figure 9:
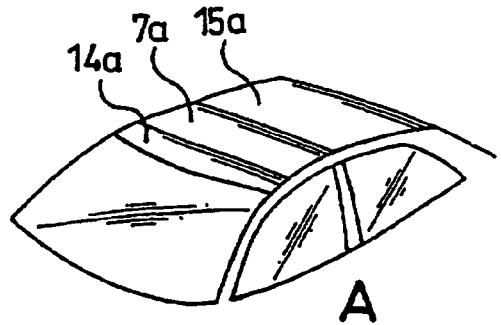
FIG. 9 shows, in views 9A, 9B, and 9C, schematic perspectives which correspond, respectively, to the modular roofs of FIGS. 8A, 8B, and 8C.
Figure 9:
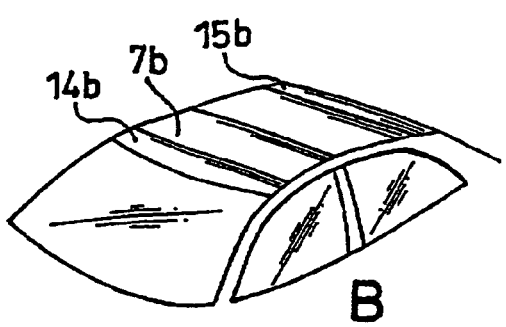
Figure 9:
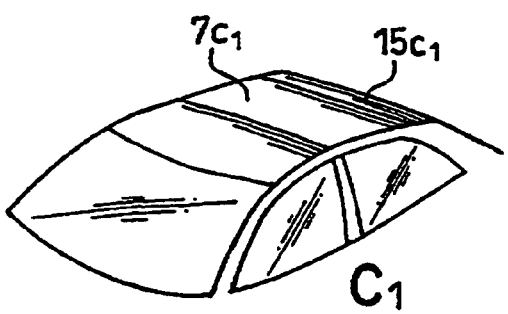
Figure 9:
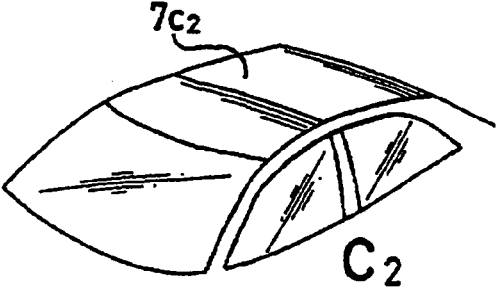

The roof module element 7a which forms the sliding roof unit and which is shown schematically in FIGS. 8A and 9A covers a small portion, for example, roughly one third of the surface of the modular roof or the roof structure opening 35. It is connected to the front roof module element 14a and the back roof module element 15a of relatively great length.

The roof module element 7b (see FIGS. 8B and 9B) is connected to a front and a back roof module element 14b and 15b of smaller lengths which essentially cover the cross members 3 and 4 of the roof structure 2.

The roof module element $7C_1$ (see FIGS. 8C and $9C_1$) forms essentially the entire top part of the modular roof. There still remains a back roof module element $15C_1$ which is, for example, necessary to produce the connection to the rear hatch.

The roof module element $7C_2$ (see FIG. $9C_2$) forms essentially the entire top part of the roof. The connections between the roof module element or the sliding roof unit $7C_1$ or $7C_2$ to the windshield, and optionally to the rear window, can be produced in any known manner.

FIGS. 11a, 11b and 11c again show three embodiments of the modular roof. The modular roof can selectively have a cover 36 which closes the entire roof structure opening 35, for example, a sheet metal or glass cover (FIG. 11a). A second version of the modular roof (FIG. 11b) contains a front and a back fixed roof module element 14 and 15 and a sliding roof unit 7 located in between, the back roof module element 15 being much larger than the front roof module element 14. A third version of the modular roof (FIG. 11c) contains a front and a back fixed roof module element 14 and 15 which have roughly the same size, a sliding roof unit 7 located in between and another cover 37 which can be a fixed cover or a sliding roof cover.

As is shown in FIGS. 4 to 7, each frame element 9 to 12 which is attached directly to the corresponding member 3 to 6 of the roof structure 2 comprises means so that, with the interposition of a seal 17, it can rest on a flange 18 which is provided on the inside of the members 3, 4, 5, 6.

Figure 4:
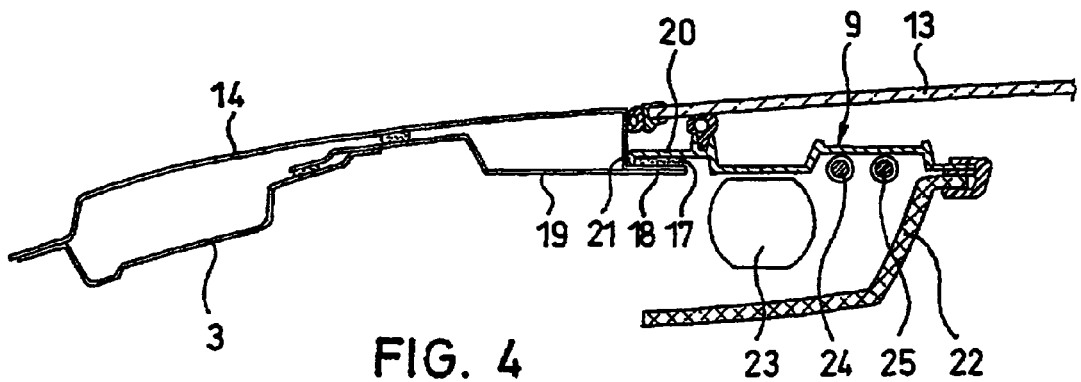
FIG. 4 is an enlarged sectional view along section plane IV—IV in FIG. 1 of the embodiment shown in FIG. 2.

In the embodiment shown in FIG. 4, the front roof module element 14 covers the front cross member 3 and a reinforcing sheet 19 which is attached to the back end of the front roof module element 14 and forms the flange 18. The front end of the front cross frame element 9 ends with a covering 20 which is essentially parallel to the flange 18 and which has a folded-down front edge 21 which rests on the flange 18, its pressing on a cement strip 17 which forms a seal. The cement strip 17 contains, for example, a polyurethane cement. A visible, prefabricated headliner lining 22 on the front cross frame element covers a drive motor 23 and cables 24, 25 for driving the movable cover 13 of the sliding roof unit.

Figure 5:
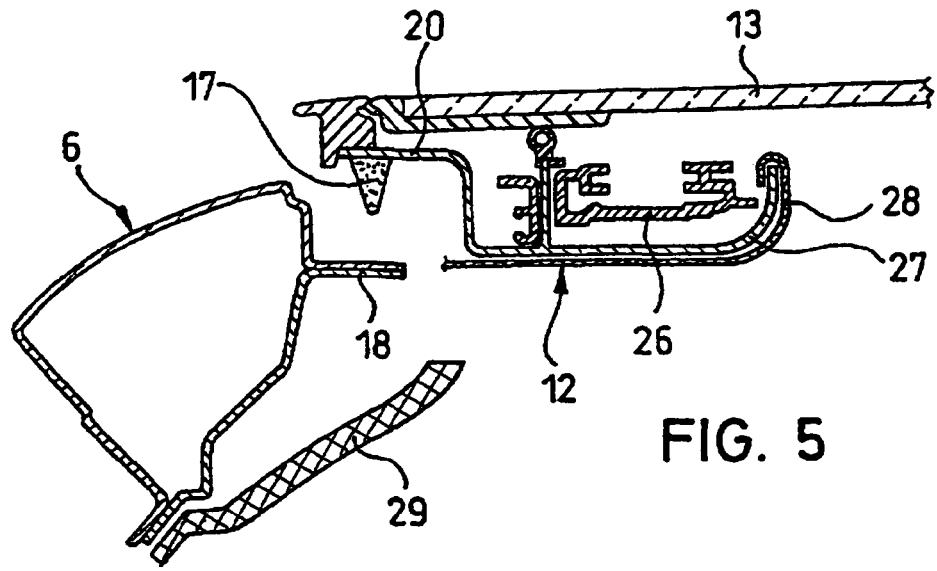
FIG. 5 is an enlarged sectional view along section plane V—V in FIG. 1 of the embodiment shown in FIG. 2.

In the embodiment shown in FIG. 5, the side frame element 12 of the frame 8, which is located exactly over the flange 18 of the front left side member 6, on the bottom of the covering 20 bears a cement strip 17 which is not yet pressed together. A unit 26 which forms the side guide rail of the sliding roof cover 13 is covered laterally towards the vehicle interior by a wall 27 with a visible surface which is covered, in the conventional manner, with a fabric 28. The headlining 29 which comprises, for example, one or more handles and one or more airbags (not shown) is mounted in the conventional manner on the side member 6.

Figure 6:
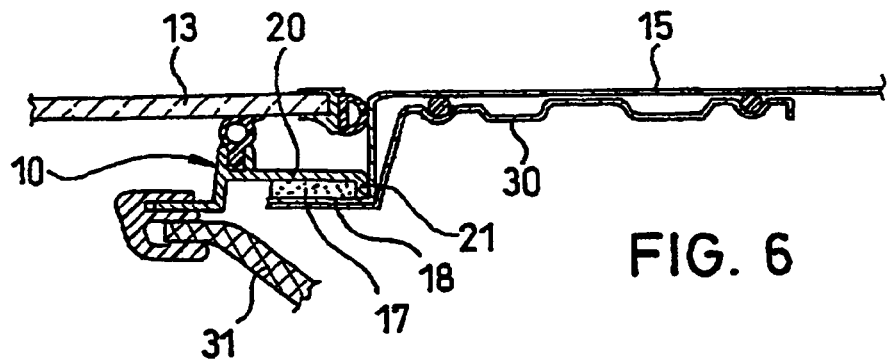
FIG. 6 is an enlarged sectional view along section plane VI—VI in FIG. 1 of the embodiment shown in FIG. 2.

In the embodiment shown in FIG. 6, the back roof module element 15, on its bottom, comprises a ribbed reinforcement 30 which, together with the roof module element 15, forms the flange 18. The visible, prefabricated headlining 31 is attached to the back cross frame element 10.

Figure 7:
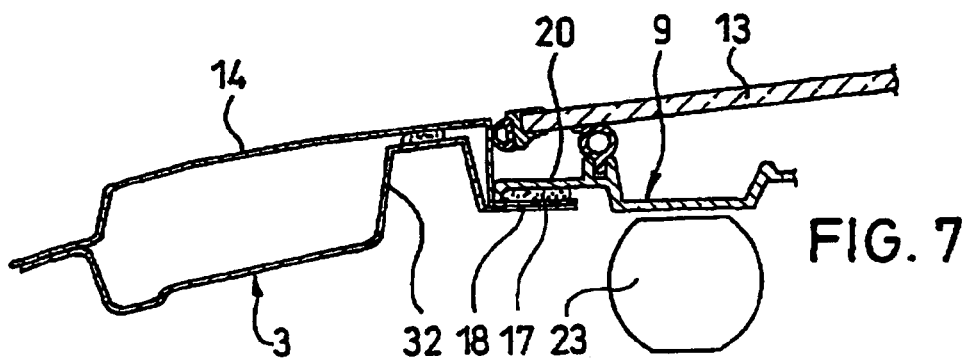
FIG. 7 is a view similar to FIG. 4 of the embodiment shown in FIG. 3.

In the embodiment shown in FIG. 7, the front roof module element 14 covers the front cross member 3, which has a rear U-shaped profile section with an end section 32, with an outer leg which runs downward and a flange 18 which is then bent to the back.

The sliding roof unit 7, 16 is prefabricated such that it can be mounted on the roof structure opening 35 of a vehicle 1 as a complete modular parts system which is provided with an inner headlining.

As is shown schematically in FIGS. 2 and 3, first the front roof module element 14 and the back roof module element 15 (if this is present) are mounted. Thereupon, the sliding roof unit 7, 16 is placed on the roof structure 2 (arrow 33 in FIG. 3). Then, the front headlining 22, the side headlining 29 and the back headlining 31 (arrows 34) can be mounted.

Thus, the described modular roof of simple structure has roof module elements which can be located and can be attached directly to the side roof members 5, 6 of the, for example, sheet metal roof structure 2 of a vehicle, and other elements, for example, a front and/or a back roof module element 14 and 15 can be added to the modular roof easily and economically.

The linings, optionally with additional components such as a sunshade, handles, etc., can then be mounted in the conventional manner.

Such a modular roof enables a reduction of installation and investment costs, offers the advantages of modularity with the same vehicle type, and larger and thus more efficient opening of the sliding roof by there being complete structural freedom with respect to the execution of the inner and outer shapes.

The conventional interfaces with respect to seals, water drain tubes and means for adjusting the movable cover can also be reduced by such a modular roof.

Such a modular roof enables simple installation of accessories, such as, for example, an antenna, an operating console or a cable harness, etc.

This invention is not limited to the described embodiments, but rather numerous modifications and changes can be undertaken without going beyond the framework of the invention.

I claim:

1. Modular roof for a motor vehicle with a roof structure shell having a front and a back cross member and a right and a left side member, comprising:
   at least two roof module elements, each of which is individually detachably mounted directly on at least one of the cross and the side members of the roof structure shell for enabling conversion of the roof from one type to another by replacement of at least one of the module elements with one or more of a plurality of other different types of module elements,
   wherein the cross members and the side members border a roof opening of the roof structure shell,
   wherein the roof module elements extend over the entire width of the roof opening and
   wherein the at least two roof module elements at least partially close said roof opening.

2. Modular roof as claimed in claim 1, wherein at least a third roof module element is provided for closing a portion of the roof opening which remains between the two roof module elements.

3. Modular roof as claimed in claim 1, wherein at least a third roof module element is provided for closing a portion of the roof opening which remains between one of the roof module elements and a cross member of the roof structure shell.

4. Modular roof as claimed in claim 1, wherein the roof module elements comprise at least one of opaque covers, transparent covers, and functional roof parts.

5. Modular roof as claimed in claim 4, wherein said functional roof parts comprise openable sunroof units.

6. Modular roof as claimed in claim 1, wherein the roof structure shell is made of sheet metal.

7. Modular roof as claimed in claim 1, wherein one of the roof module elements is a sliding roof unit with a mounting frame.

8. Modular roof as claimed in claim 7, wherein the mounting frame of the sliding roof unit comprises a front and a back cross frame element and a right and a left side frame element;
   wherein a cover is movably supported on the mounting frame; wherein each of the side frame elements comprises means for attaching thereof to a respective side member; and
   wherein each of the cross frame elements extends over the entire width of the roof structure shell between the side members.

9. Modular roof as claimed in claim 8, wherein the at least two roof module elements are replaceable by said sliding roof unit and wherein the front cross frame element is adapted for direct attachment to the front cross member which is located at a top edge of a windshield and the back cross frame element is adapted for direct attachment to the back cross member which is located at a top edge of a rear window.

10. Modular roof as claimed in claim 8, wherein each of said frame elements comprises means for resting of a flange on an inner side of a respective cross member of the roof structure shell with the interposition of a seal.

11. Modular roof as claimed in claim 7, wherein the sliding roof unit is attachable to the roof structure shell as a partial system which is provided with a prefabricated inner headlining.

12. Motor vehicle with a sheet metal roof structure shell having a front and a back cross member and a right and a left side member defining a single roof opening, and a modular roof unit having at least two roof module elements, each of which is individually detachably mounted directly on the roof structure by having been lowered onto an upper side of each side member so as to close the roof opening;
   wherein one of the roof module elements is a sliding roof unit with a mounting frame;
   wherein the mounting frame of the sliding roof unit comprises a front and a back cross frame element and a right and a left side frame element;
   wherein a cover is movably supported on the mounting frame;
   wherein each of the side frame elements comprises means for attaching thereof to a respective side member;
   wherein each of the cross frame elements extends over the entire width of the roof structure shell between the side members; and
   wherein the sliding roof unit is installed in one of several alternatively usable positions within the roof opening relative to another of the roof module elements, the front cross member and the back cross member, the roof being convertible from one configuration to another by replacement or positional exchange of the roof module elements.

13. Modular roof as claimed in claim 1, wherein the roof module elements comprise a number of different module elements which is greater than the at least two roof module elements which are mountable on the roof structure, said module elements being mountable in alternative arrangements and combinations involving said plurality of module elements that is less than said number of the module elements, whereby selective combinations of at least two roof elements enable diversely configured modular vehicle roofs to be provided.

14. Motor vehicle according to claim 12, wherein the one of the alternatively usable positions in which the sliding roof unit is installed is between a front roof module element, and a back roof module element.

15. Motor vehicle according to claim 12, wherein the one of the alternatively usable positions in which the sliding roof unit is installed is between the front cross member and a back roof module element.

* * * * *